(12) United States Patent
Navada

(10) Patent No.: US 9,111,536 B2
(45) Date of Patent: Aug. 18, 2015

(54) METHOD AND SYSTEM TO PLAY BACKGROUND MUSIC ALONG WITH VOICE ON A CDMA NETWORK

(75) Inventor: Mukund Kanyana Navada, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 248 days.

(21) Appl. No.: 13/042,452

(22) Filed: Mar. 7, 2011

(65) Prior Publication Data

US 2012/0231768 A1    Sep. 13, 2012

(51) Int. Cl.
| | |
|---|---|
| *G06F 17/00* | (2006.01) |
| *G10L 19/22* | (2013.01) |
| *H04N 21/414* | (2011.01) |
| *H04N 21/81* | (2011.01) |
| *G01L 19/06* | (2006.01) |
| *G10L 19/012* | (2013.01) |
| *G10L 19/06* | (2013.01) |
| *G10L 25/21* | (2013.01) |

(52) U.S. Cl.
CPC .......... *G10L 19/22* (2013.01); *H04N 21/41407* (2013.01); *H04N 21/8113* (2013.01); *G10L 19/012* (2013.01); *G10L 19/06* (2013.01); *G10L 25/21* (2013.01)

(58) Field of Classification Search
CPC ......... G10L 19/24; G10L 19/06; G10L 19/12; G10L 19/167; G10L 19/002; G10L 19/00
See application file for complete search history.

(56) References Cited

U.S. PATENT DOCUMENTS

| | | | | |
|---|---|---|---|---|
| 6,014,621 | A | * | 1/2000 | Chen .............................. 704/220 |
| 2003/0200092 | A1 | * | 10/2003 | Gao et al. ....................... 704/258 |
| 2004/0128126 | A1 | * | 7/2004 | Nam et al. ..................... 704/225 |
| 2008/0027715 | A1 | * | 1/2008 | Rajendran et al. ............ 704/205 |
| 2008/0219472 | A1 | * | 9/2008 | Chhatwal et al. ............ 381/94.3 |

OTHER PUBLICATIONS

Section 4.2 titled "Model Parameter Estimation" of 3rd Generation Partnership Project 2 (3rdGPP2) specification, "Enhanced Variable Rate Codec (EVRC)", 3GPP2 C.S0014-0, Version 1.0.

* cited by examiner

*Primary Examiner* — Curtis Kuntz
*Assistant Examiner* — Thomas Maung
(74) *Attorney, Agent, or Firm* — Mirna Abyad; Frank D. Cimino

(57) ABSTRACT

A method and system for compressing an audio signal. The method includes receiving a segment of an audio signal and selectively disabling noise suppression for the received segment. The segment is filtered in a noise-suppression module if noise suppression is not disabled. The method also includes calculating an autocorrelation coefficient and an LSP coefficient, predicting a short-term coefficient and long-term coefficients according to the LSP coefficient and calculating one or more bandwidth-expanded correlation coefficients. Further, the method includes determining the type of packet in which to encode the segment. An encoding rate is selected from among a full rate encode, a half-rate encode, and an eight-rate encode if noise suppression is not disabled. An encoding rate is selected from among a full rate encode and a half-rate encode if noise suppression is disabled. Furthermore, the segment is formed into a packet of the determined type and selected rate.

11 Claims, 7 Drawing Sheets

METHOD AND SYSTEM TO PLAY BACKGROUND MUSIC ALONG WITH VOICE ON A CDMA NETWORK

TECHNICAL FIELD

Embodiments of the disclosure relate to a method of compressing an audio signal.

BACKGROUND

Enhanced variable rate codec (EVRC) is a codec used in code division multiple access (CDMA) networks for optimized coding of human speech signals. The EVRC is extensively used in wireless networks, such as cellular networks, to minimize the amount of noise transmitted with the human voice over wireless networks.

Today, a cell phone user can utilize a variety of value-added services. One such service includes tuning into a news broadcast using the cell phone. The news broadcast typically includes background music. In such a scenario, the voice-centric approach of the EVRC codec interprets the background music as noise and attenuates the broadcast signal. As a result of this attenuation, whenever music is played along with voice at the transmitter, the cell phone user hears nothing because the signal is attenuated whenever the music is present.

Existing methods of playing background music along with voice on the CDMA network are also inefficient in that they increase the latency of a encoder on the CDMA network and in effect the complexity of the encoder. An efficient method and solution is thus required to play voice with background music on a CDMA network that uses the EVRC codec.

SUMMARY

An example of a method of compressing an audio signal includes receiving a segment of an audio signal and selectively disabling noise suppression for the received segment. The segment is filtered in a noise-suppression module if noise suppression is not disabled. The method also includes calculating an autocorrelation coefficient and a line spectral pairs (LSP) coefficient, predicting a short-term coefficient and long-term coefficients according to the LSP coefficient, and calculating one or more bandwidth-expanded correlation coefficients. Further, the method includes determining the type of packet in which to encode the segment according to the short-term, the long-term, and the bandwidth-expanded correlation coefficients. If noise suppression is not disabled, an encoding rate is selected from among a full rate encode, a half-rate encode, and an eight-rate encode. If noise suppression is disabled, an encoding rate is selected from among a full rate encode and a half-rate encode. Furthermore, the segment is formed into a packet of the determined type and selected rate.

An example of a system for transmitting an audio signal to a mobile phone includes a mobile phone base station, an audio input channel in the base station, a processor in the base station, and a transmitter in electronic communication with the processor. The processor is programmed to selectively filter an audio signal carried by the audio input channel according to whether the audio signal comprises music. The processor also selects one of an encoding rate for the audio signal from among a full rate and a half-rate if the audio signal includes music, and an encoding rate for the audio signal from among the full rate, the half-rate and an eighth-rate if the audio signal does not include music. Further, the processor encodes the audio signal at the selected encoding rate.

BRIEF DESCRIPTION OF THE DRAWINGS

In the accompanying figures, similar reference numerals may refer to identical or functionally similar elements. These reference numerals are used in the detailed description to illustrate various embodiments and to explain various aspects and advantages of the disclosure.

DETAILED DESCRIPTION OF THE EMBODIMENTS

Various embodiments discussed in this disclosure pertain to a method and system to play background music along with voice on a CDMA network.

Figure 1:
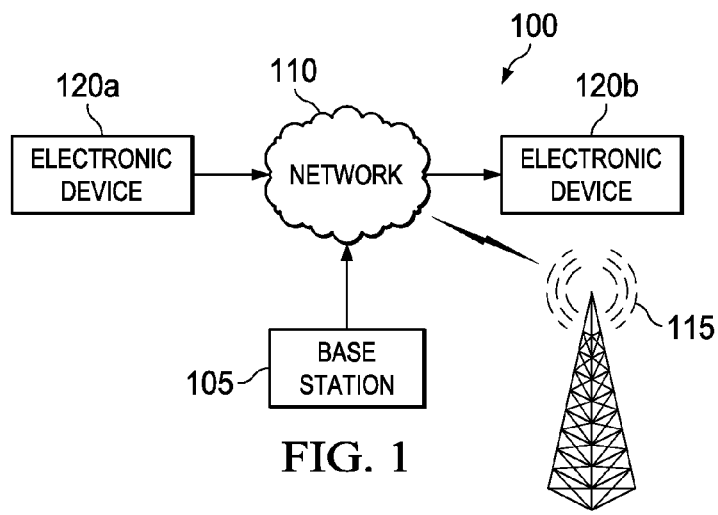
FIG. 1 is a block diagram of an environment, in accordance with which various embodiments can be implemented.

As shown in FIG. 1, an environment 100 includes a base station 105, and a network 110. A broadcasting station 115 is in electronic communication with the base station 105. A plurality of electronic devices, for example an electronic device 120a and an electronic device 120b, are also in communication with the base station 105 though the network 110. The base station 105 facilitates communication between the electronic devices. The broadcasting station 115 can be in communication with the base station 105 directly or through the network 110. Examples of the network 110 include, but are not limited to, a telecommunication network, a radio network, a local area network (LAN) and a wide area network (WAN). Examples of the electronic devices include, but are not limited to, a computer, a laptop, a mobile device, a handheld device, a personal digital assistant (PDA), and any electronic equipment used in telecommunications.

In an embodiment, the base station 105 receives information from a source, encodes the information and transmits the information to the destination. The information can include speech, music, or both. A plurality of communication channels are provided in the base station 105 for receiving and transmitting the information. An application running at the base station 105 is configured to receive the broadcast through the communication channels. A noise suppression module coupled to the communication channels is used for suppressing noise in the received information. The information received through the communication channels is then encoded using a speech codec. In a CDMA-based network, an Enhanced Variable Rate Codec (EVRC) is used for encoding the information. A XDAIS Digital Media (XDM) standard is used by the application in configuring properties for the encoding. The XDAIS stands for eXpressDsp Algorithm Interoperability Standard.

In one embodiment, the base station 105 receives the information from the electronic device 120a. Since the information from the electronic devices is usually voice data, the noise suppression module filters the noise in the received information. The filtered information is then encoded prior to the transmission to the electronic device 120b. In a second embodiment, a broadcast is received by the base station 105 from the broadcasting station 115. If the information from broadcasting station 115 includes both music and voice data, the noise suppression module coupled to the communication channels is disabled by the application. The broadcast is encoded and then transmitted by the base station 105 to electronic devices subscribed to the broadcast.

Figure 2:
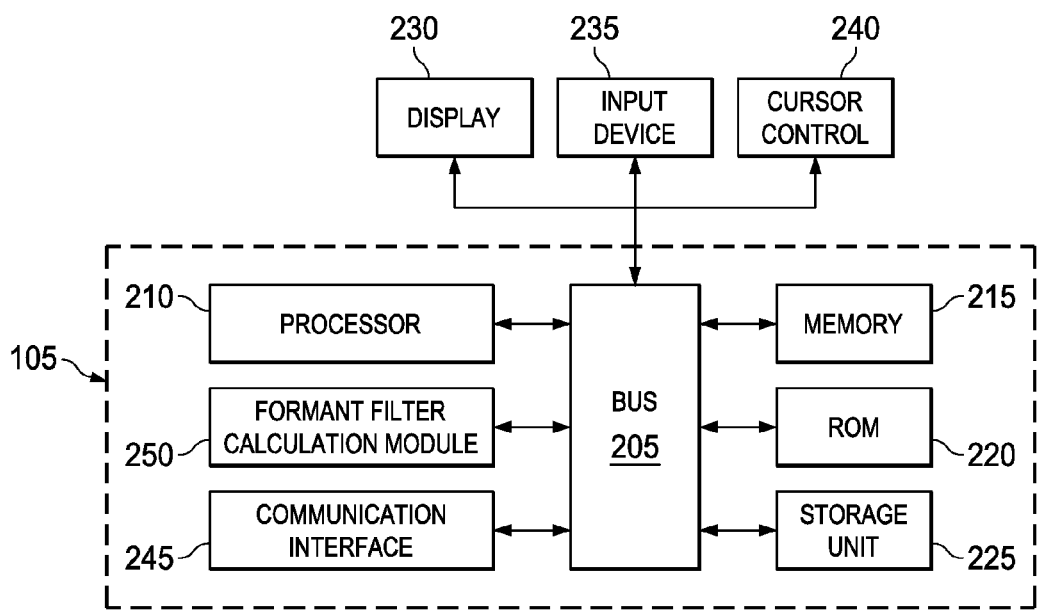
FIG. 2 is a block diagram of a base station, in accordance with one embodiment.

FIG. 2 is a block diagram of the base station 105, in accordance with one embodiment. The base station 105 includes a bus 205 for communicating information, and a processor 210 coupled to the bus 205 for processing the information. The base station 105 also includes a memory 215, for example a random access memory (RAM) coupled to the bus 205 for storing information required by the processor 210. The memory 215 can be used for storing temporary information required by the processor 210. The base station 105 can further include a read only memory (ROM) 220 coupled to the bus 205 for storing static information required by the processor 210. A storage unit 225, for example a magnetic disk, a hard disk or an optical disk, can be provided and coupled to the bus 205 for storing the information.

The base station 105 can be coupled via the bus 205 to a display 230, for example a cathode ray tube (CRT) or liquid crystal display (LCD), for displaying information. An input device 235, including various keys, is coupled to the bus 205 for communicating information to the processor 210. A cursor control 240, for example a mouse, a trackball, a joystick, or cursor direction keys, is used for communicating information to the processor 210. The input device and cursor control may be used for controlling the display 230 and can also be coupled to the base station 105.

In some embodiments, the steps of the present disclosure are performed by the base station 105 using the processor 210. The information can be read into the memory 215 from a machine-readable medium, for example the storage unit 225. In alternative embodiments, hard-wired circuitry can be used in place of or in combination with software instructions to implement various embodiments.

The term machine-readable medium can be defined as a medium providing data to a machine to enable the machine to perform a specific function. The machine-readable medium can be storage medium. Storage media can include non-volatile media and volatile media. The storage unit 225 can be a non-volatile medium. The memory 215 can be a volatile medium. All such media must be tangible to enable the instructions carried by the media to be detected by a physical mechanism that reads the instructions into the machine. In an embodiment, the storage medium can include a recovery buffer for storing one or more protocol data units.

Examples of the machine-readable medium include, but are not limited to, a floppy disk, a flexible disk, hard disk, magnetic tape, a CD-ROM, optical disk, punch cards, paper tape, a RAM, a PROM, EPROM, and a FLASH-EPROM.

The base station 105 also includes a communication interface 245 coupled to the bus 205 for enabling signal and data communication. Examples of the communication interface 245 include, but are not limited to, a zigbee port, or any wireless port specified by Institute of Electrical and Electronics Engineers (IEEE) 802.15.6 task group. The communication interface 245 is operable to receive an audio signal. The communication interface 245 may handle one of Universal Mobile Telecommunications System (UMTS), High Speed Packet Access (HSPA), HSPA+, based protocol and radio access protocols.

In some embodiments, the processor 210 can include one or more processing units for performing one or more functions of the processor 210. The processing units are hardware circuits performing specified functions. These specified functions include selectively filtering the audio signal received by the communication interface according to whether the audio signal comprises music. For the audio signal comprising music, an encoding rate for the audio signal is selected from among a full rate and a half-rate. For the audio signal excluding music, the encoding rate for the audio signal is selected from among the full rate, the half-rate and an eighth-rate. Further, the processor encodes the audio signal based on the selected encoding rate.

Further, the base station includes a formant filter calculation module 250 in communication with the processor and operable to perform functions such as calculation of an auto-correlation coefficient and an line spectral pairs (LSP) coefficient, prediction of a short-term coefficient according to the LSP coefficient, prediction of long-term coefficients according to the LSP coefficient and calculation of one or more bandwidth-expanded correlation coefficients. The long-term coefficients are pitch delay ($\tau$) and long-term prediction gain ($\beta$). The encoding rate is selected by the processor 210 based on the autocorrelation coefficient, the short-term coefficient, the long-term coefficients and the one or more bandwidth-expanded correlation coefficients.

In some embodiments, the processor 210 can perform the functions of the formant filter calculation module 250.

Figure 3:
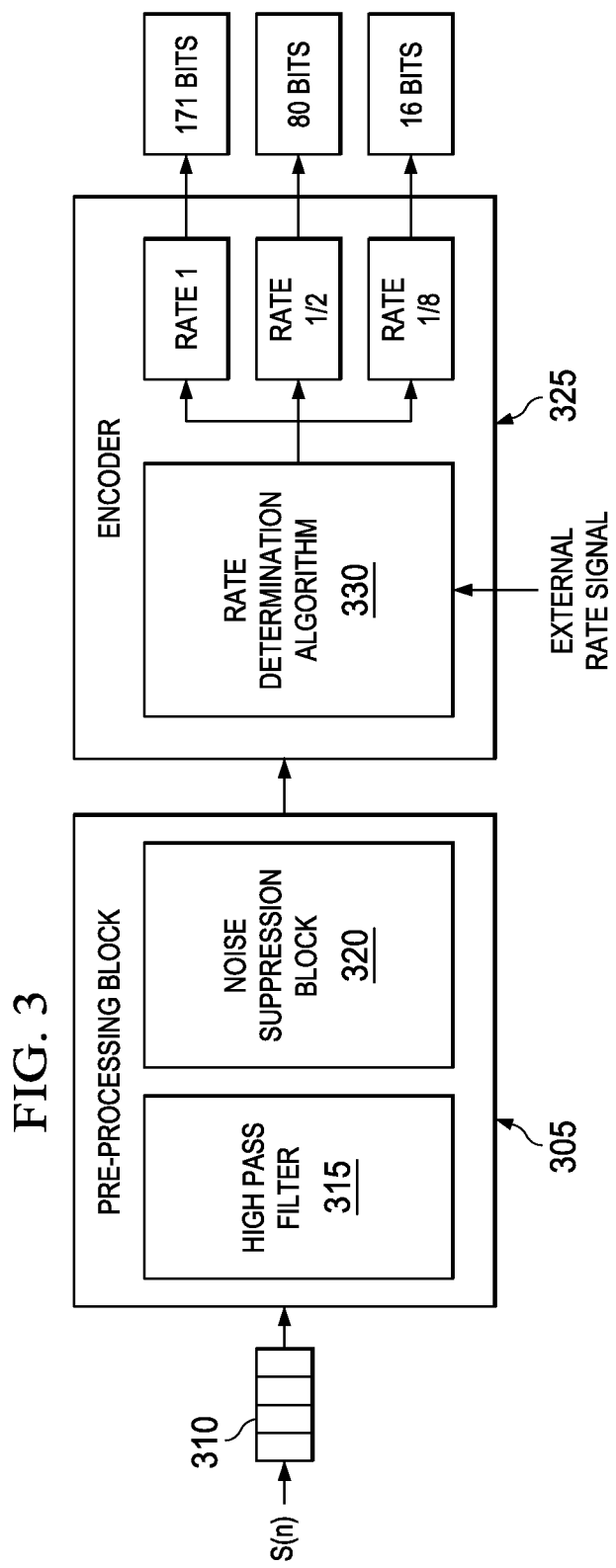
FIG. 3 is a block diagram that illustrates an operation of an EVRC encoder.

As shown in FIG. 3, a pre-processing block 305 receives an input signal 310. In an embodiment, the input signal s(n) 310 is an 8 KHz 16 bit pulse-code modulated (PCM) audio signal. The input signal 310 is split into 20 millisecond (ms) frames (segments). The pre-processing block 305 includes a high pass filter (HPF) 315 and a noise suppression block 320. Each frame is then passed through the HPF 315 and the noise suppression block 320 to filter noise. The filtered frames are then provided to an encoder 325 for encoding. Here, the encoder 325 is an EVRC encoder.

The EVRC encoder 325 is optimized to human speech signal. The EVRC encoder 325 enables transmission of voice signals over a wireless network. Due to bandwidth constraints in a wireless environment, the encoder uses linear predictive coding (LPC) technology with a slight variation and vector quantization. Such an encoder is referred to as relaxed code excited linear prediction (RCELP) coder. The encoder using linear predictive coding (LPC) places emphasis on pitch and formant frequency of the input signal 310. However, music component are perceived as noise by the encoder using the LPC due to the similarities in the frequency spectrum component. Hence, a rate determination algorithm (RDA) 330 within the EVRC encoder 325 is operable to classify the various input audio signals. An external rate signal is provided to the RDA 330 to direct encoding rate for the audio signal 310. For a speech signal, the EVRC encoder 325 encodes the signal at a full rate, a half rate, and ⅛ rate to attenuate noise content. For a music signal, the EVRC encoder 325 performs encoding at full rate and a half rate without attenuating the input signal 310. For the full rate encoding, 171 bits are allocated per packet. For half rate encoding, 80 bits are allocated per packet. For ⅛ rate encoding, 16 bits are allocated per packet.

In an embodiment, functions of the pre-processing block 305 and the EVRC encoder 325 are performed by the processor 210.

Figure 4A:
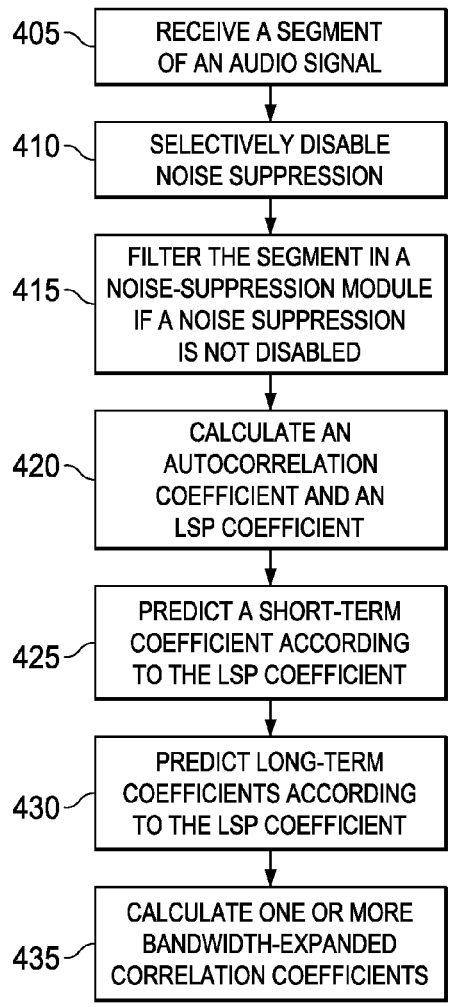
FIGS. 4a and 4b are a flow chart illustrating a method for compressing an audio signal, in accordance with one embodiment.
Figure 4B:
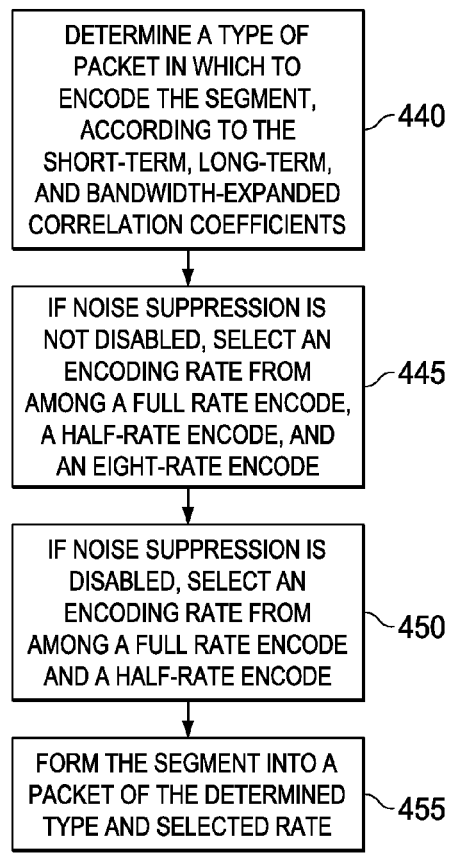

Referring to FIG. 4*a* and FIG. 4*b*, various steps involved in compressing an audio signal s(n) at the base station 105 are illustrated.

The audio signal is an 8 KHz 16 bit pulse-code modulated (PCM) audio signal. The audio signal is split into 20 millisecond (ms) segments.

At step 405, a segment of the audio signal is received. The audio signal is received by a communication channel of the base station 105. Here, the segment of the audio signal is received from either one of the electronic device 120*a* or the broadcasting station 115. The segment includes a plurality of speech samples of the audio signal.

In an embodiment, the processor 210 in the base station detects the communication channel receiving the audio signal. The processor 210 identifies the source of the audio signal. An audio signal originating from an electronic device is primarily voice data and is likely to have noise, whereas an audio signal originating from a broadcasting station typically includes voice data, music, and other audio components and is less likely to have noise. On receiving the audio segment, the processor instantiates encoding of the audio segment using an Enhanced Variable Rate CODEC (EVRC) encoder. In some embodiments, the segment is fed to a high pass filter (HPF), for example a Butterworth filter, to remove low frequencies.

In one embodiment, an application on the base station 105, for example a voice gateway application, manages information received by the communication channel.

At step 410, noise suppression is selectively disabled by the processor 210 during the encoding.

In an embodiment, the noise suppression is disabled while encoding an audio segment received from the broadcasting station 115. The noise suppression is disabled since the audio segment received from the broadcasting station 115 typically includes music content along with the voice data. Further, the music content includes spectral components that tend to be perceived as noise by EVRC encoder.

In contrast, the noise suppression is enabled for an audio signal received from one of the electronic devices since they are prone to external noise. For example, noise may result from vehicles in the vicinity of a mobile device during a call.

In some embodiments, separate communication channels may be assigned for receiving audio signals from the electronic device 120*a* or the broadcasting station 115. In such a scenario, the noise suppression is enabled or disabled based on the channel assigned.

At step 415, filter the segment in a noise-suppression module if the noise suppression is not disabled. The filtered segment is denoted using s' (n).

The noise suppression module determines and attenuates noise content in the segment. The functions of the noise suppression module are explained in conjunction with FIG. 5.

If the noise suppression is disabled, no filtering is performed on the segment.

At step 420, an autocorrelation coefficient and a line spectral pairs (LSP) coefficient are calculated for the segment. The autocorrelation coefficient and the LSP coefficient can be calculated using the autocorrelation method and Durbin's recursion.

The segment after noise suppression is denoted by s'(k). The segment s'(k) is also referred to as a pre-processed signal. The segment s'(k) includes 320 pre-processed speech samples, i.e. $0 \le k < 320$. Samples 0 through 79 are 'lookback' from a previous segment, samples 80 through 239 belong to the segment (current segment) received at step 405, and samples 240 through 319 are 'lookahead' to a next segment.

The segment s'(k) is windowed using a Hamming window $W_H(k)$ centered at the end of the segment s'(k). Hence, a last 160 samples constitute last half of the segment and 80 samples of the 'lookahead'. The below Table. 1 illustrates the segment after noise suppression s'(k) along with a hamming window.

TABLE 1

| s'(k) 0–80 | 80–240 | 240–320 |
|---|---|---|
| lookback | Current speech | lookahead |
| | Hamming Window (160–320) | |

The equation for hamming window is represented as $$W_H(k) = 0.54 - 0.46\cos\left(\frac{2\pi}{160}(k-160)\right);\ 160 \le k \le 320 \tag{1}$$

The expression for windowed speech is $$s_H'(k-160) = W_H(k)s'(k);\ 160 \le k \le 320 \tag{2}$$

The first 17 autocorrelation function of windowed speech $\{s'_H(k-160)\}$, R, are referred to as autocorrelation coefficients and is calculated using $$R(k) = \sum_{i=0}^{159-k} s'_H(i)s'_H(i+k);\ 0 \le k < 16 \tag{3}$$

The above autocorrelation coefficients are then spectrally smoothed by windowing as follows. Such autocorrelation coefficients are also called bandwidth expanded correlation coefficients $R_w$.

$$R_w(k) = \begin{cases} 1.00003R(k); & k = 0 \\ \exp\left[-\frac{1}{2}\left(\frac{40\pi k}{8000}\right)^2\right]R(k); & 1 \le k \le 16 \end{cases} \tag{4}$$

The above procedure describes the method for calculating the autocorrelation coefficient $R_w$ in accordance with an embodiment.

Determination of Linear Predictive Coding (LPC) Coefficients

LPC Coefficients are determined from Autocorrelation coefficients $R_w$ using Durbin's Recursion illustrated in Table. 2.

TABLE 2

```
{
  E^(0) = R_w(0)
  i = 1
  while (i ≤ 10)
  {
```

$$k_i = \frac{1}{E^{i-1}}\left[R_w(i) - \sum_{j=1}^{i-1} a_j^{i-1} R_w(i-j)\right]$$

```
    a_i^(i) = k_w
    j = 1
    while ( j < i)
```

TABLE 2-continued

```
{
    a_j^{(i)} = a_j^{(i-1)} - k_i a_{i-j}^{i-1}
    j = j + 1
}
E^{(i)} = (1 - k_i^2) E^{(i-1)}
i = i + 1
}
}
```

The LPC coefficients are, {a}={a1, a2, ... a10}.

The LPC coefficients represent the spectral envelope of the digital speech in compressed form. The LPC coefficients make up a model of the vocal tract shape that produced the original speech. A spectrum generated from these coefficients would show the properties of the vocal tract shape. The formant filter representation of the LPC coefficients is represented as $$A(z) = 1 - \sum_{k=1}^{10} a_k z^{-k} \quad (5)$$

The formant filter can be considered as approximately representing the envelope of speech signal.

Transmission of the LPC coefficients directly is undesirable, since they are very sensitive to errors. Hence, an advanced form of representation is used for transmitting the LPC coefficients. One such form of representation is line spectral pairs (LSP) decomposition that ensures stability of predictor, and spectral errors are local for small coefficient deviations.

LSP Coefficients Determination

The LPC coefficients, {a}={a1, a2, ... a10}, are bandwidth expanded using an exponential window as shown below. The bandwidth expansion of the LPC coefficients is required to stabilize the formant filter for analysis.

$$a_k = (0.994)^k a; 0 < k \le 10 \quad (6)$$

The bandwidth expanded LPC coefficients are converted to LSP coefficients using the formant filter representation LPC coefficients as shown in equation (5). Here, polynomial A(z) is $$A(z) = 1 - \sum_{k=1}^{10} a_k z^{-k},$$

where {a} are the bandwidth expanded LPC coefficients.

The polynomial A(z) is then split into two polynomials, one symmetrical and other asymmetrical.

$$P(z) = A(z) + z^{-11} A(z^{-1}) = 1 + \sum_{i=1}^{5} p_i z^{-i} + \sum_{i=6}^{10} p_{11-i} z^{-i} + z^{-11}; \quad (7)$$

$$p_i = -a_i - a_{11-i}$$

where P(z) is the symmetrical polynomial.

$$Q(z) = A(z) - z^{-11} A(z^{-1}) = 1 + \sum_{i=1}^{5} q_i z^{-i} - \sum_{i=6}^{10} q_{11-i} z^{-i} + z^{-11}; \quad (8)$$

$$q_i = -a_i + a_{11-i}$$

where Q(z) is the asymmetrical polynomial.

The LSP frequencies are the 10 roots which exists between $\omega=0$, $\omega=5$ in the following two equations:

$$P'(\omega) = \cos 5(2p\omega) + p'_1 \cos 4(2p\omega) + \ldots + p'_4 \cos(2p\omega) + p'_5/2 \quad (9)$$

$$Q'(\omega) = \cos 5(2p\omega) + q'_1 \cos 4(2p\omega) + \ldots + q'_4 \cos(2p\omega) + q'_5/2 \quad (10)$$

where for equation (9) and equation (10), p and q values are calculated recursively using $p'_0 = q'_0 = 1$, $p'_i = p_i - p'_{i-1}$, $q'_i = q_i + q'_{i-1}$, and $1 \le i \le 5$.

Since, the formant filter representation is stable, the roots alternate for the two polynomials P'(ω) and Q'(ω). Thus, $\omega_1$, $\omega_3$, $\omega_5$, $\omega_7$ and $\omega_9$ are roots of the polynomial P'(ω), and $\omega_2$, $\omega_4$, $\omega_6$, $\omega_8$ and $\omega_{10}$ are roots of the polynomial Q'(ω). The 10 roots are collectively called the LSP coefficient and is represented using $$\Omega(m) = \{\omega_1, \omega_2, \ldots, \omega_{10}\} \quad (11)$$

At step 425, a short-term coefficient is predicted for the segment according to the LSP coefficient. The short term coefficient is calculated using the LSP coefficient and a filtered segment from step 415. The short term coefficient, also referred to as a short term prediction residual, is denoted by a short-term residual signal {ε(n)}

Generation of Short-Term Residual Signal {ε(n)}

The short-term residual signal {ε(n)} is generated by passing the filtered segment s'(n) through a inverse filter created by interpolating LSP coefficient Ω(m−1) of the previous segment and the LSP coefficient Ω(m) of the current segment.

The filtered segment s'(n) is split into 5 sub-segments, and a separate set of LSP coefficient is calculated for each sub-segment.

For each sub-segment k, the LSP coefficient is calculated using $$\Omega(m,k) = (1-\mu_k)\Omega(m-1) + \mu_k \Omega(m); 0 \le k \le 4 \quad (12)$$

where values for interpolator constants {μ} and corresponding speech samples are given in Table. 3.

TABLE 3

| k | Sub-segment start sample | Sub-segment start sample | $\mu_k$ |
|---|---|---|---|
| 0 | 0 | 79 | 0.0 |
| 1 | 80 | 132 | 0.1667 |
| 2 | 133 | 185 | 0.5 |
| 3 | 186 | 239 | 0.8333 |
| 4 | 240 | 319 | 1.0 |

Using equation (9), (10), (7), (8), (5) and (6), the interpolated LSP coefficient for the sub-segments is converted to a corresponding LPC coefficient.

The short-term residual signal {ε(n)} is generated by passing the filtered segment s'(n) through the inverse filter using an appropriate LPC derived for one of the sub-segments. The appropriate LPC are used based on the sub-segment that the speech sample belongs. For example, the LPC coefficient is calculated for sub-segment k=0 (refer Table. 3) for a speech sample '32'. The short-term residual signal {ε(n)} is represented as $$\varepsilon(n) = s'(n) - \sum_{i=1}^{10} a_i(k) s'(n-i), \quad (13)$$

where, $a_i(k)$ is interpolated LPC coefficient for sub-segment k, the value of k based on the sub-segment including the speech sample.

The initial state of inverse filter is zero for each segment of the audio signal.

At step 430, long-term coefficients are predicted according to the LSP coefficient. The long-term coefficients are pitch delay (τ) and long-term prediction gain (β). The short-term residual signal {ϵ(n)} is used for estimating long-term prediction gain and the pitch delay for the segment.

The pitch delay is the delay that maximizes the autocorrelation function. The pitch delay estimation is carried out independently over two estimation windows. The first window includes entire speech samples of the segment and the second window includes second half of the segment and the look-ahead of the next segment (refer to Table. 1).

Non-Exhaustive Open Loop Delay Search

The short-term residual signal {ϵ(n)} is filtered and decimated by a factor of four to generate the decimated residual signal {ϵ$_d$(n)}. The autocorrelation function of the decimated residual signal is given by $$r(d) = \sum_{k=0}^{40-d} e_d(k)e_d(k+d); 5 \le d \le 30 \quad (14)$$

And, the pitch delay $d_{max}$, corresponding to maximum positive correlation, $r_{max}$, is found.

Refinement of Open Loop Delay Estimates

The determined pitch delay estimate is refined by searching for a better delay estimate in the neighborhood of the smoothed delay estimate. The optimal delay estimate, $D_{max}$, is calculated as the index corresponding to, $R_{max}$, which is the maximum positive value of $$R(D) = \sum_{n=0}^{159-D} e(n+n_0)e(n+n_o+D); \quad (15)$$

$$\max\{20, 4d_{max} - 3\} \le D \le \min\{120, 4d_{max} + 3\}$$

where $n_0$=80 and 160 for first and second estimation windows.

Long-Term Prediction Gain Calculation

The energy of undecimated residual signal is calculated as follows $$R_e(d) = \sqrt{\sum_{i=0}^{159-D_{max}} e^2(i+n_0) \sum_{j=0}^{159-D_{max}} e^2(j+n_0+D_{max})} \quad (16)$$

Using the energy derived in equation 16, we can derive the long-term prediction gain by $$\beta = \max\left\{0, \min\left\{1, \frac{R_{max}}{R_e(0)}\right\}\right\} \quad (17)$$

At step 435, one or more bandwidth-expanded correlation coefficients are calculated.

Using equation (4), the bandwidth-expanded correlation coefficients are calculated by spectrally smoothing of autocorrelation coefficients (equation 3). The process of calculating of bandwidth-expanded correlation coefficients is described in step 420.

In an embodiment, the step 435 is performed simultaneously as step 420.

In some embodiments, the calculation of the autocorrelation coefficient and the one or more bandwidth-expanded correlation coefficients, the prediction of the short-term coefficient, the prediction of the long-term coefficients can be performed with techniques described in section 4.2 titled "Model Parameter Estimation" of 3rd Generation Partnership Project 2 (3rdGPP2) specification, "Enhanced Variable Rate Codec (EVRC)".

At step 440, a type of packet for encoding the segment is determined according to the short-term coefficient, the long-term coefficients, and the bandwidth-expanded correlation coefficients.

At step 445, an encoding rate is selected from among a full rate encode, a half-rate encode, and an eight-rate encode if noise suppression is not disabled, else step 450 is performed.

The encoding rate is determined using a rate determination algorithm (RDA). The segment is divided into two bandwidths, for example f(1) of 0.3-2.0 kHz and f(2) of 2.0-4 kHz. The segment is divided using the bandpass filter. For each bandwidth, a band energy is determined using the autocorrelation coefficient of the segment and individual autocorrelation coefficient of the individual bandwidths. Further, two rate determination thresholds are calculated for each bandwidth. The band energy is compared with the two rate determination thresholds for the each bandwidth. If the band energy value is higher than both the thresholds, the segment is classified as full rate, if the band energy value is between the two thresholds the segment is classified as ½ rate frame and if the band energy value is below the lower threshold, the encoding rate is eighth. The procedure of classifying rate of segment is performed for the two bandwidths, and the higher of the two encoding rates is chosen as the encoding rate for the segment. The functions of the rate determination algorithm are explained in further detail in conjunction with FIG. 6.

The RDA uses a Voice Activity Detection (VAD) algorithm in conjunction with the encoding rate to determine the type of packet.

At step 450, an encoding rate is selected from among a full rate encode and a half-rate encode if noise suppression is disabled.

The segment is divided into two bandwidths, for example f(1) of 0.3-2.0 kHz and f(2) of 2.0-4 kHz using the band-pass filter. For each bandwidth, the band energy and the two rate determination thresholds are calculated for each bandwidth. The band energy is compared with the two rate determination thresholds for each bandwidth. If the band energy value is higher than both the thresholds, the segment is classified as the full rate else the encoding rate is classified as the ½-rate. The procedure of classifying the rate of segment is performed for the two bandwidths, and the higher of the two encoding rates is chosen as the encoding rate for the segment. The functions of the rate determination algorithm are explained in further detail in conjunction with FIG. 6.

At step 455, the segment is formed into a packet of the determined type and selected rate. Based on the encoding rate, parameters such as the LSP for the segment are quantized.

Upon encoding the audio segment, packets of the audio signal are transmitted.

Figure 5:
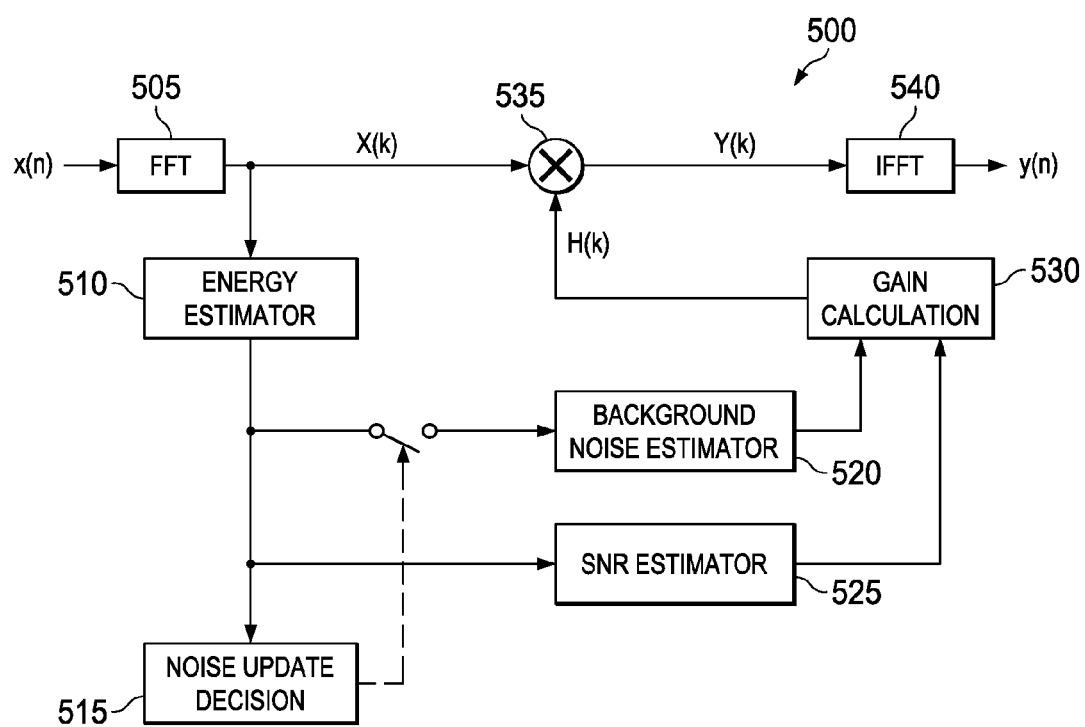
FIG. 5 is a block diagram of a noise suppression module, in accordance with one embodiment.

As shown in FIG. 5, a noise suppression module 500 is used by an EVRC encoder for suppressing noise in an input audio signal. An audio signal x(n), split into audio segments of 20 ms, is provided to the noise suppression module 500. The noise suppression module 500 is operable on segments of 10 ms. Hence, the procedure for noise suppression shall be executed twice for each audio segment. In an embodiment, the audio signal x(n) is received through a high pass filter.

The audio signal x(n) is transformed into frequency-domain values denoted by X(K) by means of a Fast Fourier Transform (FFT) 505. For each audio segment, a channel energy is estimated using an energy estimator 510. A noise update is provided for the each segment by means of the noise update decision 515 by comparing the energy estimated against a threshold. Further, a background noise is determined by a background noise estimator (BNE) 520. The BNE 520 is a very important sub-module within the noise suppression module 500 that estimates the background noise thresholds for each segment. Typically, due to noise content after a few segments, the background noise thresholds increases and triggers an attenuation of the audio signal by the noise suppression module 500. However, when the audio signal includes music, the noise suppression module is disabled.

Using the channel energy and background noise estimates, the SNR is estimated using a SNR estimator 525. If the audio segment is noise only, the background noise estimate is also updated. A minimum gain value H(K) is calculated 530 using the background noise estimate and a fixed noise floor.

A filtering operation is performed in the frequency domain by multiplying the scalar gain values H(k) to X(k) to yield Y(k). The filtering operation is performed using a multiplier 535. The filtered spectral co-efficient, Y(k), is converted back into time domain y(n) to get noise suppressed speech samples y(n) by means of a Inverse Fast Fourier Transform (IFFT) 540.

In an embodiment, the functions of the noise suppression module can be performed by the processor 210.

In some embodiments, the noise suppression can be performed with techniques described in section 4.1.2 titled "*Noise Suppression*" of 3rdGPP2 specification, "*Enhanced Variable Rate Codec (EVRC)*".

Figure 6:
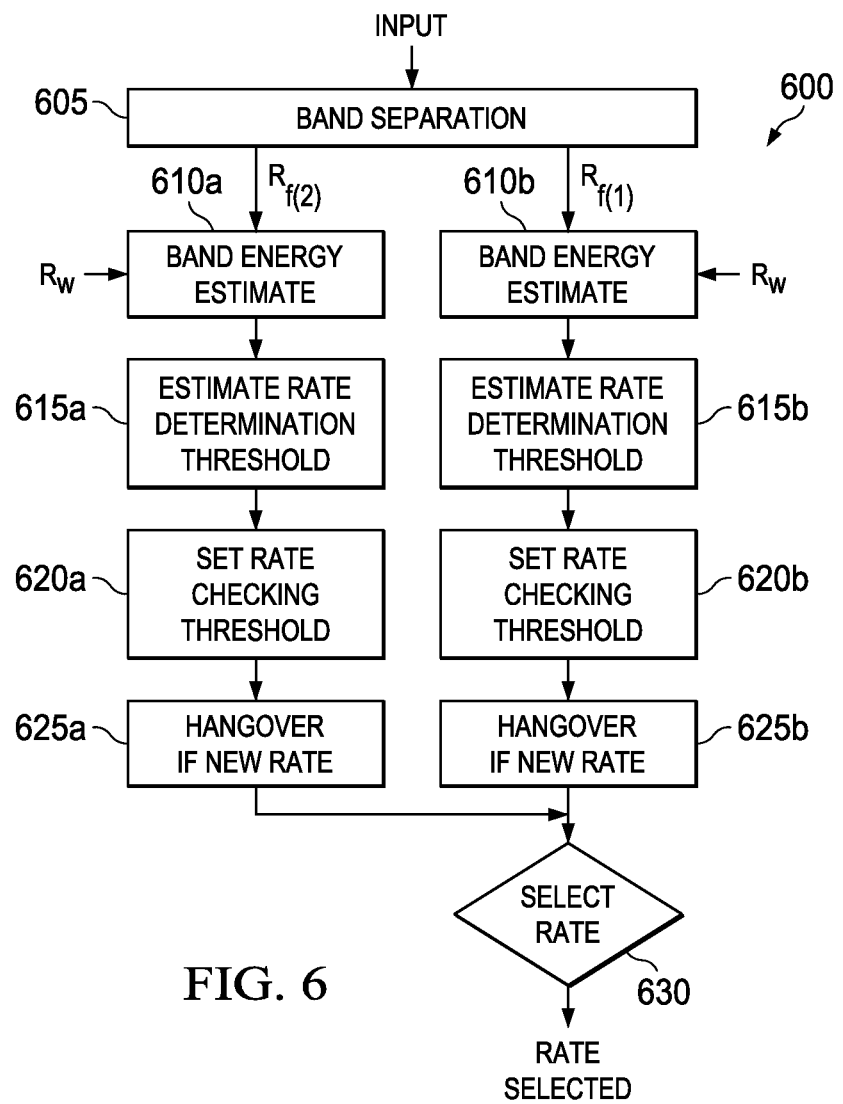
FIG. 6 is a block diagram illustrating operation of a rate determination algorithm.

As shown in FIG. 6, an input signal is provided to a rate determination algorithm 600. The input signal can be a segment of an input audio signal s(n) or a noise suppressed signal y(n) of FIG. 5. The input is divided into two frequency bandwidth by a band separation 605. The two frequency bandwidths are f(1) of 0.3-2.0 kHz and f(2) of 2.0-4 kHz. The two frequency bandwidths can be obtained using band pass filters. An autocorrelation coefficient $R_w$ is determined for the input. Similarly, autocorrelation coefficients are determined for the signal in each frequency bandwidth ($R_{f1}$ and $R_{f2}$). For each frequency bandwidth, a band energy is determined by band energy estimators 610a and 610b using the $R_w$, $R_{f1}$ and $R_{f2}$.

The RDA 600 maintains two threshold values for each frequency bandwidth. The threshold values are estimated (615a and 615b) using background noise estimate and signal estimate for each band. In one embodiment, the background noise estimate is determined for input in each frequency bandwidth using the BNE obtained in FIG. 5. The band energy is compared against the two threshold values of respective frequency bandwidths (620a and 620b). For a music signal as input, the encoding is performed using full rate and half rate. If the band energy is higher than the respective threshold values, full rate encoding is selected else half rate encoding is selected. For other audio signals, if the band energy is higher than the respective threshold values, full rate encoding is selected. If the energy is between the two thresholds, half rate encoding is selected. If the energy is below the lower threshold, the eighth rate encoding is selected. The procedure of classifying rate of segment is performed for both the bandwidths, and the higher of the two encoding rates is chosen as the encoding rate for the input segment.

In one embodiment, if consecutive segments of the audio signal are encoded at full rate and the next segment is encoded at a lower rate (half rate or $\frac{1}{8}^{th}$ rate), then m predefined segments are encoded at full rate, n predefined segments are encoded at half rate and o predefined segments are encoded at ⅛ rate, where m, n, and o are integers. The m, n, and o are denoted as hangover frames (625a and 625b). At 630, a rate of encoding is selected for the audio signal. In an embodiment, the functions of the RDA 600 can be performed by the processor 210.

In some embodiments, the rate determination can be performed with techniques described in section 4.3 titled "*Determining the Data Rate*" of 3rdGPP2 specification, "*Enhanced Variable Rate Codec (EVRC)*".

Figure 7:
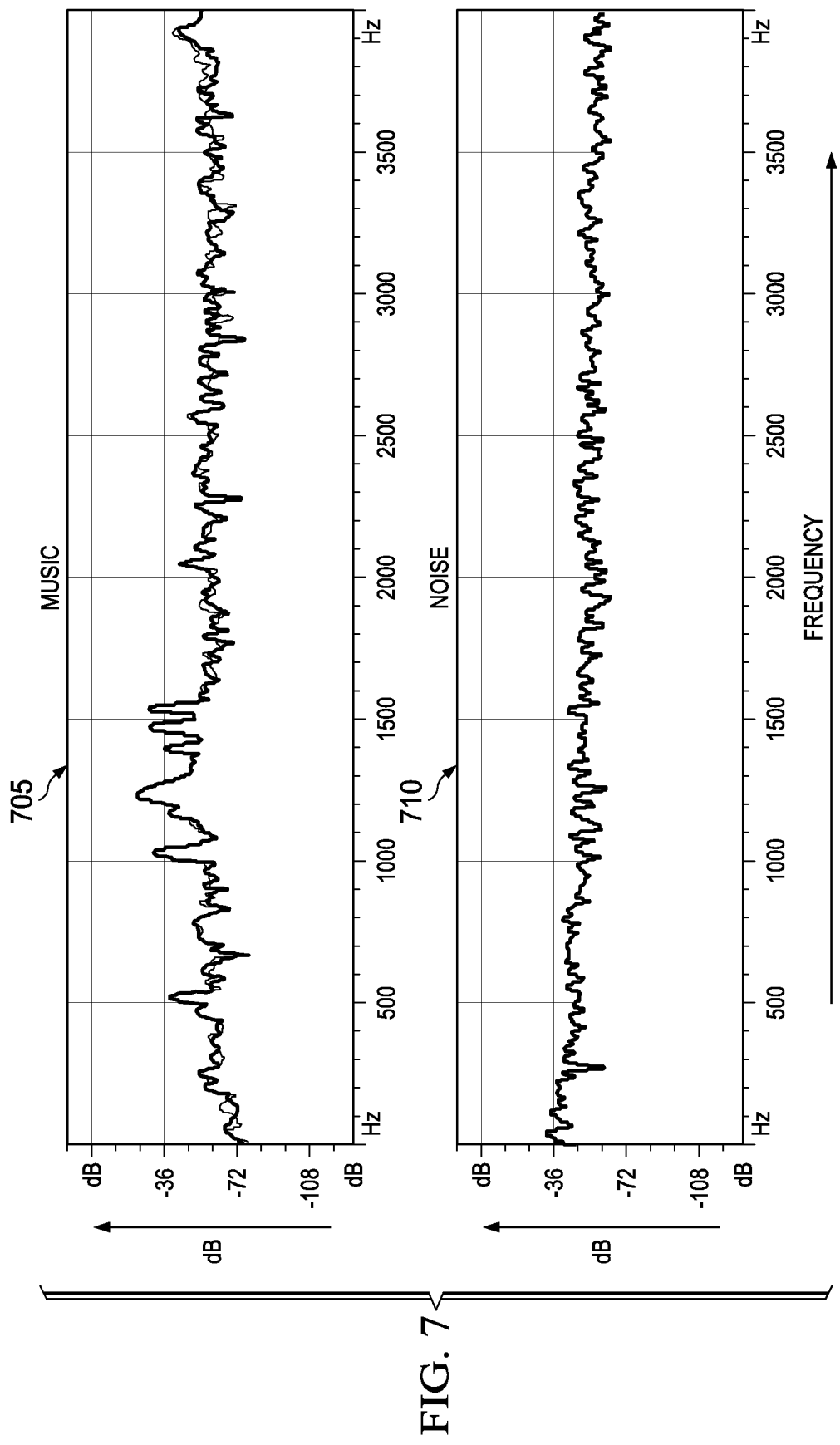
FIG. 7 is an exemplary frequency versus gain plot for a music and noise signal.

As in FIG. 7, an exemplary magnitude versus frequency plot is shown for a music signal 705 and an audio signal containing noise 710. In the illustration, it is noted that both the noise and music signals have similar spectrum component.

Figure 8A:
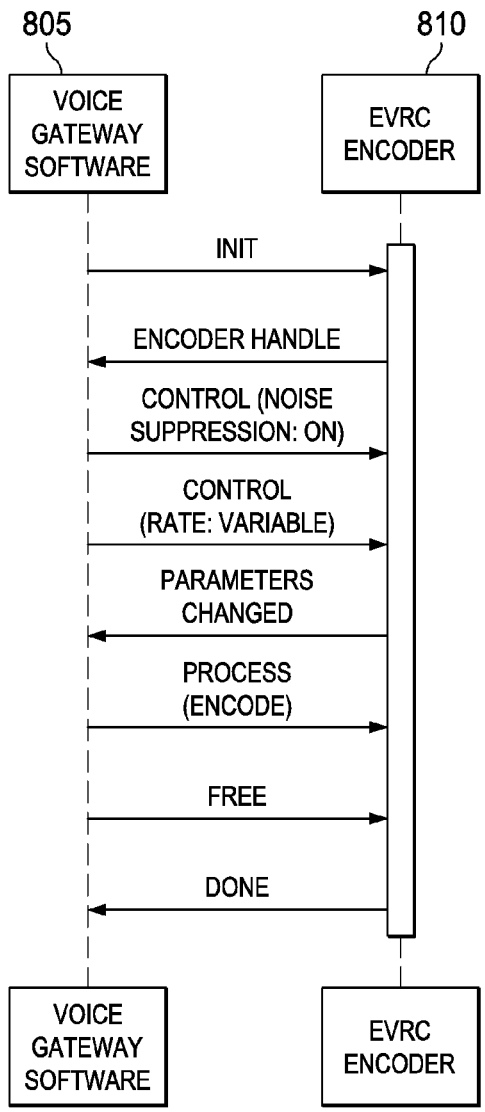
FIGS. 8a and 8b are flow diagrams illustrating an encoder handling operation, in accordance with an embodiment.

For the case of the audio signal originating from an electronic device, the method of encoding is illustrated in flow diagram of FIG. 8a.

In an embodiment, an audio signal from an electronic device is received by the base station 105. The electronic device can be a mobile device. The processor 210 on the base station 105 detects the audio signal as originating from the electronic device. In an embodiment, an application (voice gateway software) 805 running on the processor performs the functions of the processor. The voice gateway software 805 calls an 'init' function to receive a handle to the EVRC encoder 810 instance. A set of parameters are defined by the voice gateway software 805 using a 'control' signal. For example, an encoding rate, enabling and disabling of a noise suppression module. Here, noise suppression is enabled for the audio signal and an encoding rate of full rate, half rate and $\frac{1}{8}^{th}$ rate is set. The parameters defined are acknowledged by the EVRC encoder 810. Upon acknowledging, the voice gateway software 805 provides the audio signal to the EVRC encoder 810 and sends a command signal 'Process (encode)' to encode the audio signal. The EVRC encoder 810 encodes the audio signal received through a communication channel of the base station 105. Upon encoding, the EVRC encoder 810 releases the communication channel.

Figure 8B:
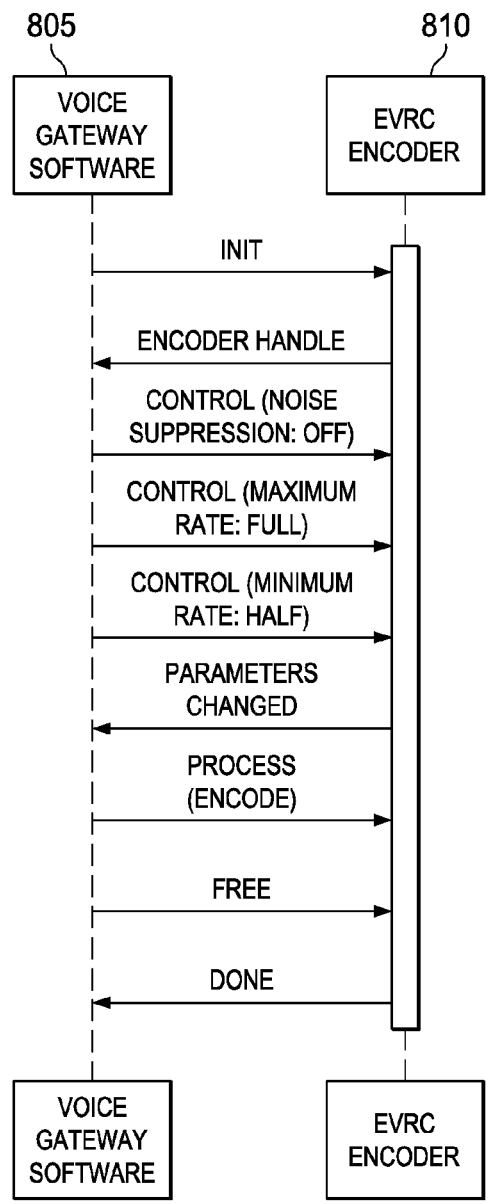

For the case of the audio signal originating from a broadcasting station, the method of encoding is illustrated in flow diagram of FIG. 8b.

In an embodiment, an audio signal from the broadcasting station is received by the base station 105. The processor 210 on the base station 105 detects the audio signal as originating from the broadcasting station. The voice gateway software 805 running on the processor performs the functions of the processor. The voice gateway software 805 calls an 'init' function to receive a handle to the EVRC encoder 810 instance. A set of parameters are defined by the voice gateway software 805 using a 'control' signal. Here, noise suppression is disabled for the audio signal and an encoding rate of full rate, half rate is set. The parameters defined are acknowledged by the EVRC encoder 810. Upon acknowledging, the voice gateway software 805 provides the audio signal to the EVRC encoder 810 and sends a command signal 'Process (encode)' to encode the audio signal. The EVRC encoder encodes the audio signal received through a communication channel of the base station 105. Upon encoding, the EVRC encoder releases the communication channel.

Encoding of audio signal for example, voice data and music signal, is implemented using a method described in FIG. 4a-4b. The method described provides for utilizing existing EVRC encoding standards whilst reducing the complexities involved in encoding the audio signal. Further, voice crash issues while playing music along with voice data has been solved.

In the foregoing discussion, each of the terms "coupled" and "connected" refers to either a direct electrical connection or mechanical connection between the devices connected or an indirect connection through intermediary devices.

The foregoing description sets forth numerous specific details to convey a thorough understanding of embodiments of the disclosure. However, it will be apparent to one skilled in the art that embodiments of the disclosure may be practiced without these specific details. Some well-known features are not described in detail in order to avoid obscuring the disclosure. Other variations and embodiments are possible in light of above teachings, and it is thus intended that the scope of disclosure not be limited by this Detailed Description, but only by the Claims.

What is claimed is:

1. A method of compressing an audio signal comprising:
   receiving a segment of an audio signal;
   selectively disabling noise suppression;
   if noise suppression is not disabled, filtering the segment in a noise-suppression module;
   calculating an autocorrelation coefficient and an line spectral pairs (LSP) coefficient;
   predicting a short-term coefficient according to the LSP coefficient;
   predicting long-term coefficients according to the LSP coefficient;
   calculating one or more bandwidth-expanded correlation coefficients;
   determining, according to the short-term, the long-term, and the bandwidth-expanded correlation coefficients, a type of packet in which to encode the segment;
   selecting an encoding rate from among a full rate encode, a half-rate encode, and an eight-rate encode based on the noise suppression setting, wherein the setting is at least one of enabled or disabled based on the type of network and wherein a higher encoding rate is selected for transmitting to a mobile device; and
   forming the segment into a packet of the determined type and selected rate.

2. The method as claimed in claim 1, wherein filtering the segment comprises:
   detecting energy levels of the segment;
   determining signal to noise ratio; and
   attenuating the noise in the segment.

3. The method as claimed in claim 1, wherein the segment comprises digital samples of the audio signal.

4. The method as claimed in claim 1, wherein the segment comprises 20 milliseconds of the audio signal.

5. The method as claimed in claim 1, wherein the autocorrelation coefficient and the LSP coefficient are calculated in a formant filter parameter calculation module.

6. The method as claimed in claim 1, wherein the long-term coefficients are pitch delay and a long-term prediction gain.

7. The method as claimed in claim 1 further comprising:
   transmitting the packet from a mobile phone base station to a mobile telephone.

8. The method as claimed in claim 1, wherein selectively disabling noise suppression comprises:
   determining if the audio signal comprises music and, if so, disabling noise suppression.

9. The method as claimed in claim 1, wherein noise suppression is enabled if the audio signal is received from the mobile device.

10. The method as claimed in claim 1, wherein noise suppression is disabled if the audio signal is received from a broadcasting station.

11. The method as claimed in claim 1, wherein the method of compressing the audio signal is performed in a mobile phone base station processor.

* * * * *